(12) United States Patent
Kincad et al.

(10) Patent No.: US 6,308,972 B1
(45) Date of Patent: Oct. 30, 2001

(54) SELF-LOCKING PLUG-IN STABILIZER BAR LINK MECHANISM

(75) Inventors: Jeffrey Lee Kincad, Clarkston; Neil Alan Wasylewski, Farmington Hills; David LeRoy Young, Bay City, all of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/576,110

(22) Filed: May 22, 2000

(51) Int. Cl.[7] ................................................. B60G 21/055
(52) U.S. Cl. ............................ 280/124.107; 280/93.511; 403/314
(58) Field of Search ...................... 280/93.511, 124.106, 280/124.107; 403/274.4, 297, 314; 411/24, 26, 27, 75

(56) References Cited

U.S. PATENT DOCUMENTS

| | | |
|---|---|---|
| 5,540,457 * | 7/1996 | Johnson ................................ 280/279 |
| 5,702,121 | 12/1997 | Song . |
| 5,707,073 | 1/1998 | Stuker et al. . |
| 5,794,965 | 8/1998 | Stuker et al. . |
| 6,076,840 * | 6/2000 | Kincaid et al. ............... 280/124.107 |

* cited by examiner

Primary Examiner—Paul N. Dickson
(74) Attorney, Agent, or Firm—Harness, Dickey & Pierce, P.L.C.

(57) ABSTRACT

A suspension assembly for a motor vehicle including a pair of end links which interconnect the opposite ends of a stabilizer bar to a pair of suspension members. Each end link has a first fastener adapted for connection to the end of the stabilizer bar and a second fastener adapted for connection to the suspension member via locking mechanism having a pair of fastener members.

19 Claims, 2 Drawing Sheets

SELF-LOCKING PLUG-IN STABILIZER BAR LINK MECHANISM

BACKGROUND OF THE INVENTION

1. Technical Field

The present invention relates generally to motor vehicle suspensions and more particularly to a suspension system having a stabilizer bar with plug-in end links connecting the hollow ends of a stabilizer bar to various suspension components.

2. Discussion

It is common practice to equip motor vehicles with an independent suspension for absorbing road shock and other vibrations while providing a smooth and comfortable ride for vehicle occupants. In suspensions of this type, an anti-roll system is commonly used to increase the roll rigidity and improve the steering stability of the vehicle. Conventional anti-roll systems include a stabilizer bar to a pivotable suspension component, such as a control arm. The stabilizer bar has an elongated central segment oriented to extend laterally across the vehicle and arm segments extending from the ends of the central segment to form a generally U-shaped configuration. The central segment of the stabilizer bar is supported for rotation about its own longitudinal axis by one or more mounting brackets which are fixed to the vehicle body or frame. Most commonly, the mounting brackets are positioned in close proximity to the arm segments for minimizing any bending moments which may be induced in the stabilizer arm.

As noted, end links are used to interconnect the distal end of each arm segment of the stabilizer bar to corresponding control arms. The end links function to accommodate the relative angular movement between the stabilizer bar and the control arm caused by the suspension traveling through its range of motion. Stabilizer bars are manufactured with an end form (i.e., eye-form or apertured paddle) at each end which is adapted to receive a fastener extending from the end link. Some end links are of the "silent block" type and have a threaded fastener, such as a bolt, which extends through a sleeved rubber grommet and the end form. A lock nut is used to secure the bolt to the end form. Another type of end link, commonly referred to as a "direct-acting" end link, is equipped with a ball joint for providing a quicker and stiffer response to suspension motion. In direct-acting links, a threaded shank of the ball stud extends through the end form and is likewise secured thereto using a lock nut.

In an effort to reduce complexity, cost and weight of anti-roll systems without sacrificing ride stability and suspension stiffness, the current trend is to use tubular stabilizer bars. As such, particular emphasis has been directed toward developing techniques for attaching the end links to the ends of the tubular stabilizer bar without the need to form an end form. Several techniques and devices are disclosed in commonly assigned U.S. application Ser. No. 09/081,113 entitled "Self-Locking Plug-in Stabilizer Bar Links", the disclosure of which is incorporated by reference as if fully set forth herein. Despite these advancements, there remains a need in the art for additional techniques and devices which allow direct attachment of the end links to the hollow ends of tubular stabilizer bars that have been cut to length, thereby eliminating the need to perform any metal forming operations on the stabilizer bar, other than bending.

SUMMARY OF THE INVENTION

Accordingly, the objective of the present invention is to provide an anti-roll system for a motor vehicle suspension having a "plug-in" connection between an end link and the hollow end of a stabilizer bar.

As a related object, the anti-roll system includes a locking mechanism for rigidly securing a shank segment of the end link within the hollow end of the stabilizer bar.

As a further object, the locking mechanism functions to rigidly secure a threaded shank segment of the end link within a non-threaded hollow end of the stabilizer bar. To this end, the locking mechanism includes a threaded adapter operable for generating radial forces for securing the locking mechanism within the hollow end of the stabilizer bar in response to tightening of the threaded shank segment into the threaded adapter.

Accordingly, the present invention, in one form, provides a suspension assembly for a motor vehicle including a pair of end links which interconnect the opposite ends of a stabilizer bar to a pair of suspension members. Each end link has a first member adapted for connection to the end of the stabilizer bar and a second member adapted for connection to the suspension member. In particular, a locking mechanism is provided for securing the first member in a socket formed in the hollow end of the stabilizer bar for securely attaching the stabilizer bar to the end link.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

In general, the present invention is directed to an anti-roll system comprised of a stabilizer bar and a pair of plug-in end links connecting the opposite ends of the stabilizer bar to a pair of suspension members in a vehicle suspension. The present invention is adapted to replace most conventional anti-roll systems and includes a locking mechanism which permits direct attachment of the plug-in end link to the hollow end of tubular stabilizer bars. Thus, the present invention may be utilized with a wide variety of vehicular suspensions and is not intended to be limited to the particular application described herein.

Figure 1:
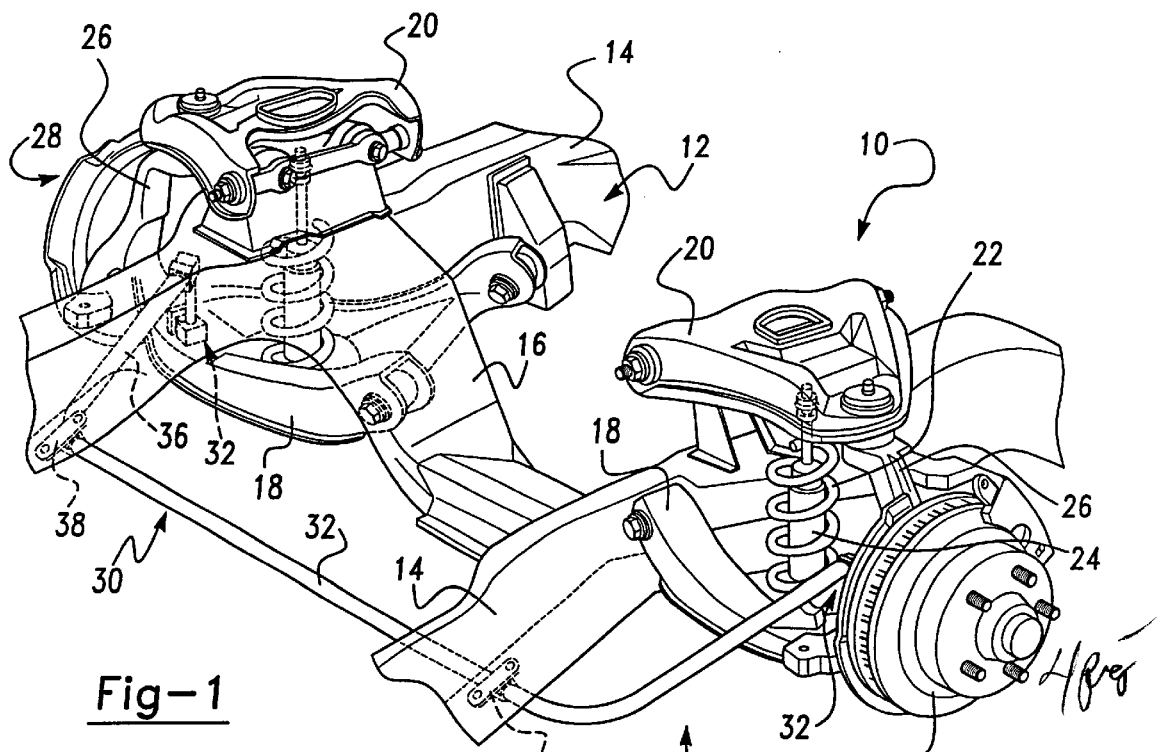
FIG. 1 is a perspective view of an exemplary independent front wheel suspension into which the anti-roll system of the present invention is incorporated.

Turning now to the drawings, FIG. 1 shows an exemplary independent front wheel suspension, generally indicated by reference numeral 10, of the type having suspension components at each wheel which are suspended from the vehicle frame. Reference will be made to a vehicle frame in the present disclosure, yet those skilled in the art will recognize that many current vehicles do not have a frame as such, but instead have regions of the body which act as an integrated frame structure. With this in mind, frame 12 is shown to partially include a pair of longitudinal side rails 14 and a crossbeam 16.

At each wheel, suspension 10 includes a lower control arm 18 and an upper control arm 20 which are both pivotally attached to frame 12. A strut assembly having a helical coil spring 22 and a strut damper 24 is retained between an intermediate portion of lower control arm 18 and frame 12 to support the weight of the vehicle body and any loads which are transmitted through lower control arm 18. Upper control arm 20 is connected to lower control arm 18 by a steering knuckle 26. A hub and rotor assembly 28 is rotatably attached to a spindle portion (not shown) of steering knuckle 26 such that a wheel and tire (also not shown) may be mounted thereon. Suspension system 10 further includes an anti-roll system 29 comprised of a stabilizer bar 30 and a pair of end links 32 which connect the ends of stabilizer bar 30 to lower control arms 18. Stabilizer bar 30 is shown to include an elongated central segment 34 which extends laterally across the vehicle and a pair of arm segments 36 which extend longitudinally along the vehicle at each end of central segment 34. Central segment 34 is rotatably attached to frame rails 14 by a pair of mounting brackets 38. The distal end of each arm segment 36 is connected to a corresponding one of the lower control arms 18 by one of the end links 32.

As will be described in connection with a preferred embodiment of anti-roll system 29, a locking mechanism is provided for directly connecting a threaded fastener associated with end link 32 into a non-threaded socket provided in the terminal end of each arm segment 36. Thus, the present invention is applicable to anti-roll systems having "plug-in" type end links adapted for receipt and retention in the hollow ends of stabilizer bar 30. The hollow ends may be formed by drilling a bore in the ends of a solid stabilizer bar or, more preferably, may be defined by the terminal ends of a tubular stabilizer bar.

Figure 2:
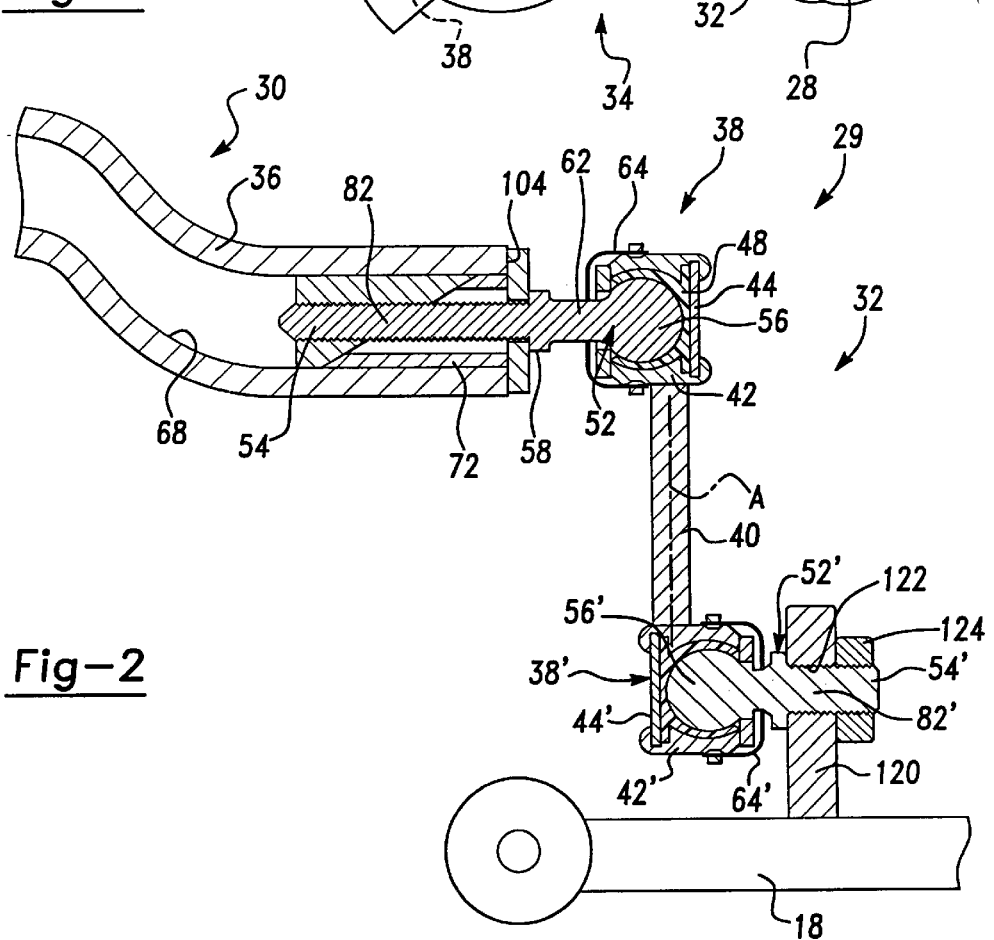
FIG. 2 is a sectional view of a portion of the anti-roll system shown in FIG. 1.
Figure 3:
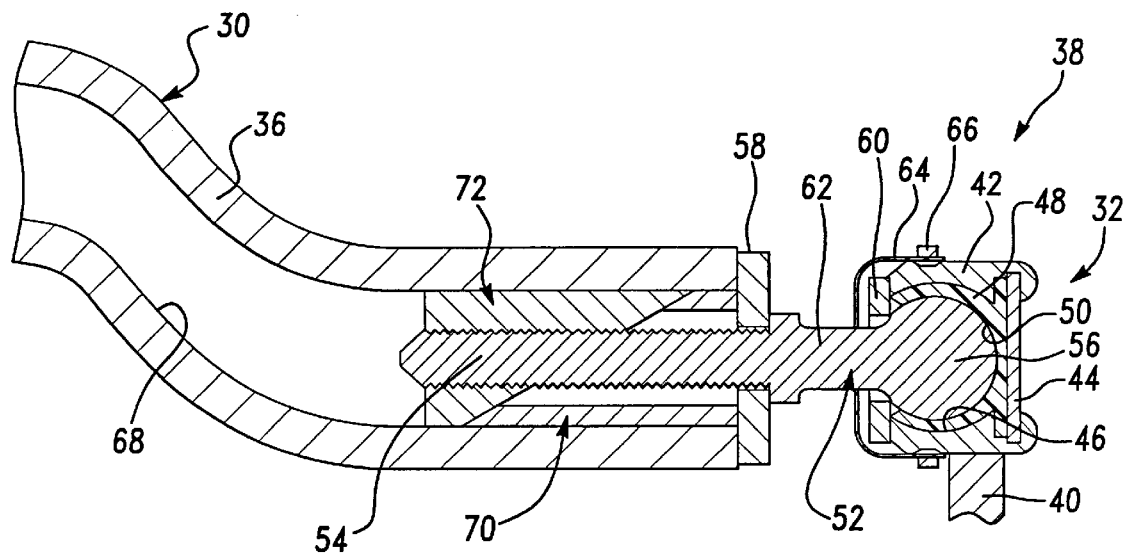
FIG. 3 is an enlarged partial view of the anti-roll system shown in FIG. 1.

Referring primarily to FIGS. 2 and 3, a "direct-acting" type of end link 32 is shown having one end fastened to stabilizer bar 30 and its opposite end fastened to lower control arm 18. According to the particular embodiment shown, the components of end link 32 are symmetrical, but oppositely oriented, about a line identified by construction line "A". In fact, end link 32 is assembled from a set of components including two ball joint assemblies 38 and 38' which are rigidly interconnected by suitable means such as, for example, a bar or rod 40. Due to the similarity of the components associated with ball joint assembly 38' with respect to the components of ball joint assembly 38, its components are identified with the same reference numerals but having a primed designation.

Ball joint assembly 38 includes a hollow cylindrical housing 42 fixedly secured to, or integrally formed with, rod 40. A disc-shaped end cap 44 is retained in housing 42 adjacent to its spherical wall 46 for defining a socket cavity therewith. A hollow spherical sleeve 48 is disposed within the socket cavity and defines a spherical socket 50. Ball joint assembly 38 also includes a ball stud 52 having a shank segment 54 and a ball segment 56 interconnected by an integral nut segment 58. Ball segment 56 is disposed in socket 50 and axially retained therein via a spring retainer 60 which is secured to housing 42. Retainer 60 includes a central aperture through which a neck 62 of ball segment 56 extends. A seal boot 64 surrounds neck 62 to enclose ball segment 56 and is secured to housing 42 by a snap ring 66 or other conventional means.

Figure 4:
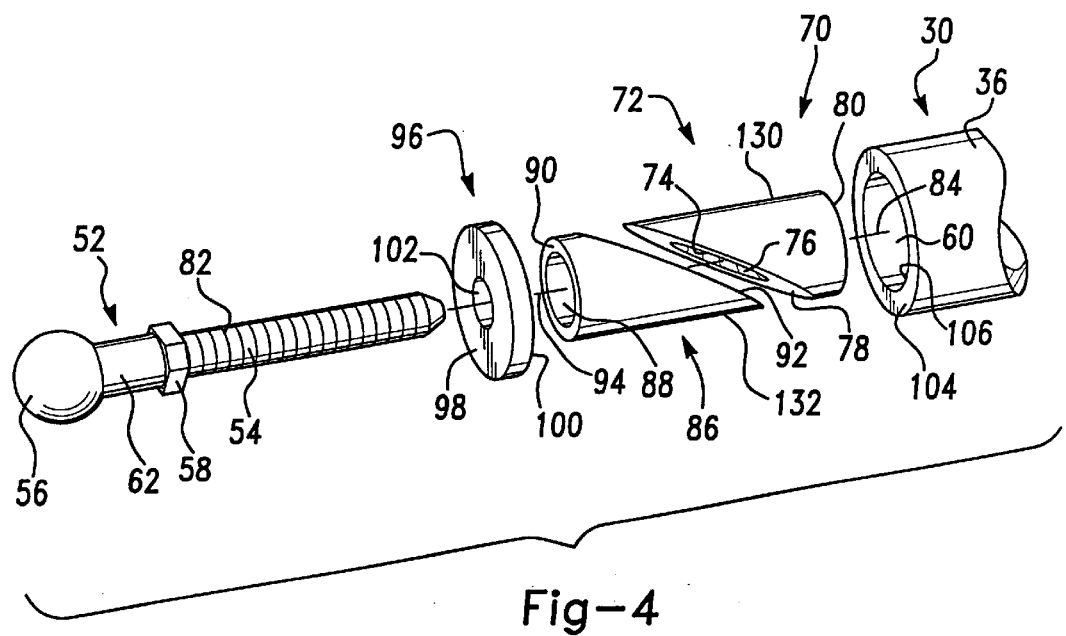
FIG. 4 is an exploded perspective view of the locking mechanism shown in FIG. 3.

With continued reference to FIGS. 2 and 3, and with additional reference to FIG. 4, the distal end of arm segment 36 of stabilizer bar 30 is shown to include a socket defined by a non-threaded axial bore 68. As is described in greater detail below, a locking mechanism 70 is provided for securing shank segment 54 of ball stud 52 within bore 68 of stabilizer bar 30. In particular, locking mechanism 70 includes a threaded adapter, hereinafter referred to as first locking sleeve 72, which is disposed in bore 68. First locking sleeve 72 has internal threads 74 formed in a bore 76 extending between its first and second end walls 78 and 80, respectively. Threads 74 are adapted to receive external threads 82 formed on shank segment 54 of ball stud 52. The first end 78 of first locking sleeve 72 is skewed to the longitudinal axis 84 of first locking sleeve 72, with the angle between the longitudinal axis 84 and the first end 78 being about 15 degrees to about 60 degrees and preferably about 30 degrees. The diameter of first locking sleeve 72 is approximately just smaller than the diameter of bore 68 so that a slip fit exists between first locking sleeve 72 and the distal end of arm segment 36.

Locking mechanism 70 also includes a hollow bushing, hereinafter referred to as second locking sleeve 86, which is also disposed in bore 68. The diameter of second locking sleeve 86 is also approximately just smaller than the diameter of bore 68 so that a slip fit exists between second locking sleeve 86 and the distal end of arm segment 36. Second locking sleeve 86 has a bore 88 that extending between its first and second ends 90 and 92, respectively. Bore 88 has a diameter that is greater than or equal to the major diameter of external threads 82 formed on shank segment 54 of ball stud 52 plus one half of the clearance between the bore 68 of stabilizer bar 30 and the one of the first and second locking sleeves 72 and 86 having the smallest diameter. The second end 92 of second locking sleeve 86 is skewed to the longitudinal axis 94 of second locking sleeve 86, with the angle between the longitudinal axis 94 and the second end 92 approximately corresponding to the angle between the longitudinal axis 84 of the first locking sleeve 72 and the first end 78 of first locking sleeve 72.

In the particular embodiment illustrated, locking mechanism 70 is also shown to include a spacer member 96. Spacer member 96 is cylindrical in shape having generally flat first and second surfaces 98 and 100, respectively, and a bore 102 formed therethrough. Bore 102 is sized to receive the external threads 82 formed on the shank segment 54 of ball stud 52. The outside diameter of spacer member 96 is preferably about equal to the outside diameter of the arm segment 36 of stabilizer bar 30 to permit the clamping force generated by ball stud 52 to be transmitted to the end 104 of the arm segment of stabilizer bar 30. Alternatively, spacer member 96 may be incorporated into ball stud 52 as either a stationary flange or a captivated washer.

Threaded tightening of ball stuck 52 into first locking sleeve 72 causes first locking sleeve 72 to generate an axial clamping force that is transmitted from first end 78 into the second end 92 of second locking sleeve 86. As the mating surfaces of the first end 78 of first locking sleeve 72 and the second end 92 of second locking sleeve 86 are skewed to the longitudinal axis 84 of first locking sleeve 72, a portion of the axial clamping force is directed in a radial direction, causing the first and second locking sleeves 72 and 86 to slide relative to one another and exert a wedging force that is of sufficient strength to frictionally engage locking mechanism 70 against the inner surface 106 of the bore 68 of stabilizer bar 30. As is obvious, nut segment 58 permits ball stud 52 to be threadably tightened relative to stabilizer bar 30 such that precise length adjustment can also be accommodated during assembly of anti-roll system 29.

As noted, end link 32 is also adapted for connection to control arm 18. To this end, and as best illustrated in FIG. 2, ball joint assembly 38' is connected to a bracket 120 extending from lower control arm 18. Specifically, shank segment 54' of ball stud 52' is inserted through a bore 122 formed in bracket 120. A suitable fastener, such as lock nut 124, is threaded onto threads 82' on shank segment 54' and tightened to a suitable torque level. Optionally, bore 122 may include internal threads for cooperating with external threads 82' on shank segment 54'.

During assembly of end link 32 to stabilizer bar 30, shank segment 54 of ball stud 52 is inserted through the bores 102 and 88 in the spacer member 96 and the second locking sleeve 86, respectively. The shank segment 54 of ball stud 52 is then threaded into the axial bore 76 of the first locking sleeve 72, thereby causing first and second locking sleeves 72 and 86 to slide against one another. The sliding motion of first and second locking sleeves 72 and 86 causes their outer surfaces 130 and 132, respectively, to frictionally engage the surface 106 of axial bore 68. This frictional engagement or "wedging" is sufficient to withstand all anticipated axial pull-out loads, thereby maintaining the rigid connection between ball stud 52 and stabilizer bar 30. While shown to be cylindrical in shape, the outer surfaces 130 and/or 132 can be of any shape which is complementary with the shape of axial bore 68. Thus, locking mechanism 70 may be incorporated into any component or components which are capable of being fit into a complementary socket formed in the end of arm segment 36 of stabilizer bar 30 and which has a threaded portion capable of receiving a threaded fastener extending from an end link.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An anti-roll system for a vehicular suspension comprising:
    a stabilizer bar having a hollow end, the hollow end having an axis and an inner surface;
    an end link having a housing and a shank extending from the housing, the shank including a threaded portion; and
    a locking mechanism mounted in the hollow end of the stabilizer bar, the locking mechanism having first and second locking members, each of the first and second locking members having a cooperating planar surface which is skewed to the axis of the hollow end of the stabilizer bar;
    wherein threaded engagement of the threaded portion of the shank and one of the first and second locking members generates a clamping force which when directed through the cooperating planar surfaces causes the first and second locking members to slide outwardly from the axis of the hollow end and engage the inner surface of the hollow end.

2. The anti-roll system of claim 1, wherein each of the cooperating planar surfaces intersects the axis of the hollow end at an angle ranging from about 15 degrees to about 60 degrees.

3. The anti-roll system of claim 2, wherein the angle is about 30 degrees.

4. The anti-roll system of claim 1, wherein the flocking member is a tubular member having an internally threaded bore formed axially therethrough.

5. The anti-roll system of claim 4, wherein the second locking member is a tubular member having a clearance hole formed axially therethrough.

6. The anti-roll system of claim 5, wherein size of the clearance hole is greater than or equal to a major diameter of the threaded portion of the shank plus the one half of the clearance between the hollow end and the one of the first and second locking members having a smallest outside diameter.

7. The anti-roll system of claim 5, wherein the first and second locking members each have an outside diameter that is about equal to a diameter of the hollow end.

8. An anti-roll system for a vehicular suspension comprising:
    a tubular stabilizer bar having a bore formed therethrough;
    an end link having a housing and a shank extending from the housing, the shank including a threaded portion; and
    a locking mechanism mounted in the bore of the stabilizer bar, the locking mechanism having first and second locking members, the first locking member having a clearance bore and a first planar end surface, the second locking member having an internally threaded bore and a second planar surface, the threaded portion of the shank disposed through the clearance bore and threadably engaged with the internally threaded bore;
    wherein exertion of an axial clamping force produced by the threaded portion of the shank causes the first and second planar surfaces to cooperatively shift the first and second members within the bore to frictionally engage the locking mechanism with the tubular stabilizer bar.

9. The anti-roll system of claim 8, wherein the second planar surface intersects an axis of the internally threaded bore at an intersection angle ranging from about 15 degrees to about 60 degrees.

10. The anti-roll system of claim 9, wherein the intersection angle is about 30 degrees.

11. The anti-roll system of claim 8, wherein the first and second locking members each have an outside diameter that is about equal to a diameter of the bore.

12. The anti-roll system of claim 8, wherein size of the clearance hole is greater than or equal to a major diameter of the threaded portion of the shank plus the one half of the clearance between the bore in the tubular stabilizer bar and the one of the first and second locking members having a smallest outside diameter.

13. An end link adapted for plug-in connection into the hollow end of a stabilizer bar, the end link comprising:
    a housing;
    a fastener having an externally threaded shank segment extending from the housing;
    a locking mechanism adapted to be mounted in the hollow end of the stabilizer bar, the locking mechanism having first and second locking members, the first locking member having a first planar surface which is skewed to a longitudinal axis of the first locking member, the second locking member having a second planar surface which is skewed to a longitudinal axis of the second locking member, the first and second planar surfaces adapted to slide laterally away from one another in response to an axial clamping force generated by the fastener and frictionally engage the hollow end of the stabilizer bar.

14. The end link of claim 13, wherein a longitudinal axis of the second locking member intersects the second planar surface at an intersection angle ranging from about 15 degrees to about 60 degrees.

15. The end link of claim 14, wherein the intersection angle is about 30 degrees.

16. The end link of claim 13, wherein the first locking member is a tubular member having an internally threaded bore formed axially therethrough.

17. The end link of claim 16, wherein the second locking member is a tubular member having a clearance hole formed axially therethrough.

18. The end link of claim 17, wherein size of the clearance hole is greater than or equal to a major diameter of the threaded portion of the shank plus the one half of the clearance between the hollow end and the one of the first and second locking members having a smallest outside diameter.

19. The end link of claim 16, wherein the first locking member has a diameter that is about equal to a diameter of the second locking member.

* * * * *

UNITED STATES PATENT AND TRADEMARK OFFICE
CERTIFICATE OF CORRECTION

PATENT NO.     : 6,308,972 B1
DATED          : October 30, 2001
INVENTOR(S)    : Jeffrey Lee Kincaid, Neil Alan Wasylewski and David Leroy Young It is certified that error appears in the above-identified patent and that said Letters Patent is hereby corrected as shown below:

<u>Title page,</u>
Item [12], "Kincad" should be -- Kincaid --.
Item [75], Inventors "Kincad" should be -- Kincaid --.

<u>Column 4,</u>
Line 22, "extending" should be -- extends --.
Line 48, "stuck" should be -- stud --.

<u>Column 6,</u>
Line 3, "flocking" should be -- first locking --.

Signed and Sealed this

Twenty-seventh Day of August, 2002

Attest:

Attesting Officer

JAMES E. ROGAN
Director of the United States Patent and Trademark Office